United States Patent
Tsai et al.

(10) Patent No.: US 8,312,574 B2
(45) Date of Patent: Nov. 20, 2012

(54) PORTABLE SOLAR SHOWER

(76) Inventors: Jyh-Hsin Tsai, Shanghai (CN);
Huai-Ping Wang, Ningbo (CN)

( * ) Notice: Subject to any disclaimer, the term of this patent is extended or adjusted under 35 U.S.C. 154(b) by 751 days.

(21) Appl. No.: 12/176,918

(22) Filed: Jul. 21, 2008

(65) Prior Publication Data

US 2010/0012748 A1    Jan. 21, 2010

(51) Int. Cl.
*A47K 3/022* (2006.01)

(52) U.S. Cl. .......................................................... 4/598

(58) Field of Classification Search ............ 4/596, 598, 4/599, 602, 615, 616; 285/123.15, 123.16; 52/79.5
See application file for complete search history.

(56) References Cited

U.S. PATENT DOCUMENTS

| | | | |
|---|---|---|---|
| 22,298 A * | 12/1858 | Mansfield ........................... 4/602 |
| 1,372,598 A * | 3/1921 | Buka .................................. 4/598 |
| 1,957,365 A * | 5/1934 | Stewart ........................ 126/392.1 |
| 3,709,198 A * | 1/1973 | Williams ....................... 122/17.1 |
| 3,962,733 A * | 6/1976 | Parry ................................ 4/615 |
| 4,084,270 A * | 4/1978 | Kersten, Jr. ....................... 4/615 |
| 4,998,302 A * | 3/1991 | Silva ................................ 4/516 |
| 5,111,538 A * | 5/1992 | Chapman .......................... 4/599 |
| 5,660,164 A * | 8/1997 | Rodriguez Sanchez ...... 126/640 |
| 5,996,142 A * | 12/1999 | Colman ........................... 4/615 |
| 6,059,143 A * | 5/2000 | Weir .............................. 222/61 |
| 6,296,626 B1 * | 10/2001 | Stein ............................. 604/294 |

* cited by examiner

*Primary Examiner* — Korie Chan
(74) *Attorney, Agent, or Firm* — Szaferman Lakind Blumstein & Blader PC

(57) ABSTRACT

A portable solar shower includes two detachable water reservoirs. One of the reservoirs may be coupled to a water source and includes a diverter valve regulating the flow and temperature of water spayed by a shower head, and the other reservoir has a port for coupling to the shower head. When the solar shower is not in use, the reservoirs may be separated from one another to form a compact package adapted for storage or transportation.

12 Claims, 4 Drawing Sheets

PORTABLE SOLAR SHOWER

FIELD OF THE INVENTION

The present invention relates generally to showering equipment for outdoor use and, more particularly, to a portable solar shower.

BACKGROUND OF THE INVENTION

Various configurations of solar showers including structural elements having lengths of about 6-7 feet have previously been disclosed. For both manufacturers and consumers of such solar showers, their storage and transportation represent a challenging task.

SUMMARY OF THE INVENTION

A portable solar shower is disclosed. In one embodiment, the solar shower includes a first water reservoir having a port for coupling to a water source and a diverter valve for regulating the flow and temperature of water spayed by a shower head thereof, and a second water reservoir having a port for coupling to the shower head. The reservoirs are detachably connected to one another (e.g., using a threaded joint having a lock ring, a clamp, etc.). When the solar shower is not in use (for example, stored or transported), the reservoirs may be separated from one another to provide even greater compactness and portability of the shower.

All objects, features and advantages of the present invention will become apparent in the following detailed written description.

The Summary is neither intended nor should it be construed as being representative of the full extent and scope of the present invention, which these and additional aspects will become more readily apparent from the detailed description, particularly when taken together with the appended drawings.

Figure 1:
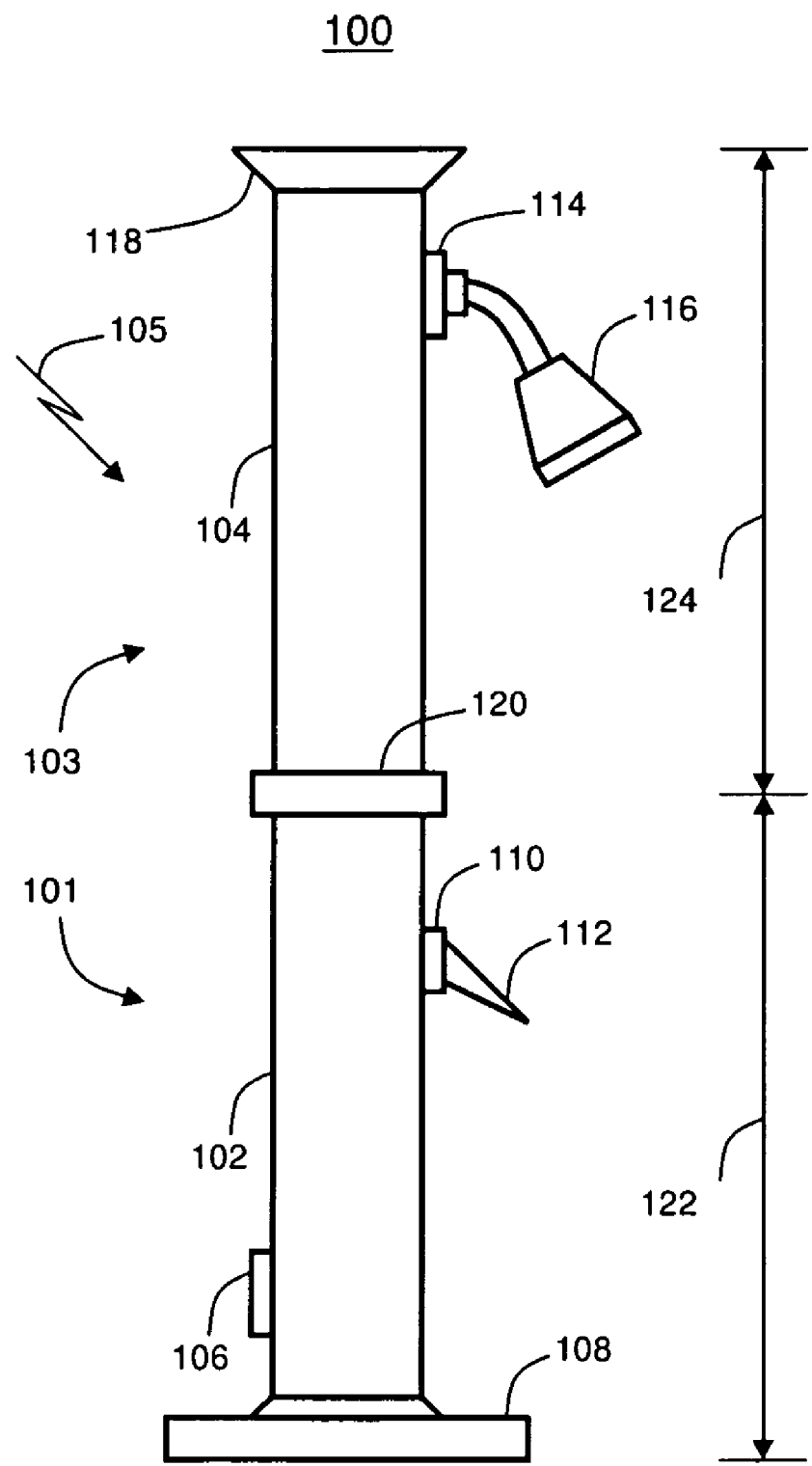
FIG. 1 is a schematic drawing illustrating a solar shower, according to one embodiment of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION

The present invention provides a portable solar shower. The invention may advantageously be utilized as an outdoor washing apparatus in open spaces such as, for example, pools, gardens, campgrounds, etc.

With reference now to the figures, and in particular with reference to FIG. 1, there is depicted a schematic drawing illustrating a solar shower 100, according to one embodiment of the invention. The shower 100 includes a first water reservoir 101, a second water reservoir 103, and a shower head 116. The second water reservoir 103 is detachably connected to the first reservoir 101 using a connector 120. Internal pluming of the reservoirs 101 and 103 is discussed in detail below in reference to FIGS. 2-3. In operation, water contained in the reservoirs 101 and 103 is heated by solar radiation 105.

The reservoir 101 generally includes an enclosure 102, an intake port 106, a diverter valve 110 having a handle 112, and a base 108. The base 108 supports the shower 100 in an operational position (for example, substantially vertical position). The shower 100 may be coupled to a water source (for example, residential water plumbing or an attachment thereto, such as a garden hose, etc.) via the intake port 106. The flow and temperature of the water flowing into and sprayed by the shower head 116 are regulated using the diverter valve 110.

The reservoir 103 generally includes an enclosure 104 having an outlet port 114 adapted for coupling to the shower head 116, and an optional cover 118. The outlet port 114 may be disposed on a sidewall of the enclosure 104 (as shown) or, alternatively, on an upper surface thereof. With embodiments wherein the outlet port 114 is disposed on the upper surface of the enclosure 104, a long shower head pipe may be utilized to create a dramatic and fashionable "long neck" design of the invention. In one embodiment, a length 124 of the water reservoir 103 (about 3-3.5 feet) is approximately equal to a length 122 of the water reservoir 101.

Typically, the enclosures 102 and 104 have form factors of elongated cylinders that, in cross-sections, have circular, rectangular, and the like shapes. The enclosures 102 and 104 may be fabricated from polymers, plastics, composites, metals, alloys, or a combination thereof. In one exemplary embodiment, the enclosures 102 and 104 are fabricated from PVC (polyvinyl chloride) or PE (polyethylene) using, for example, injection-molding technique.

The connector 120 is generally a threaded joint having a lock ring (shown in detail in FIG. 3), a clamp connector, a flange connector, and the like connector suitable for providing a rigid and water-tight coupling between the reservoirs 101 and 103.

Figure 2:
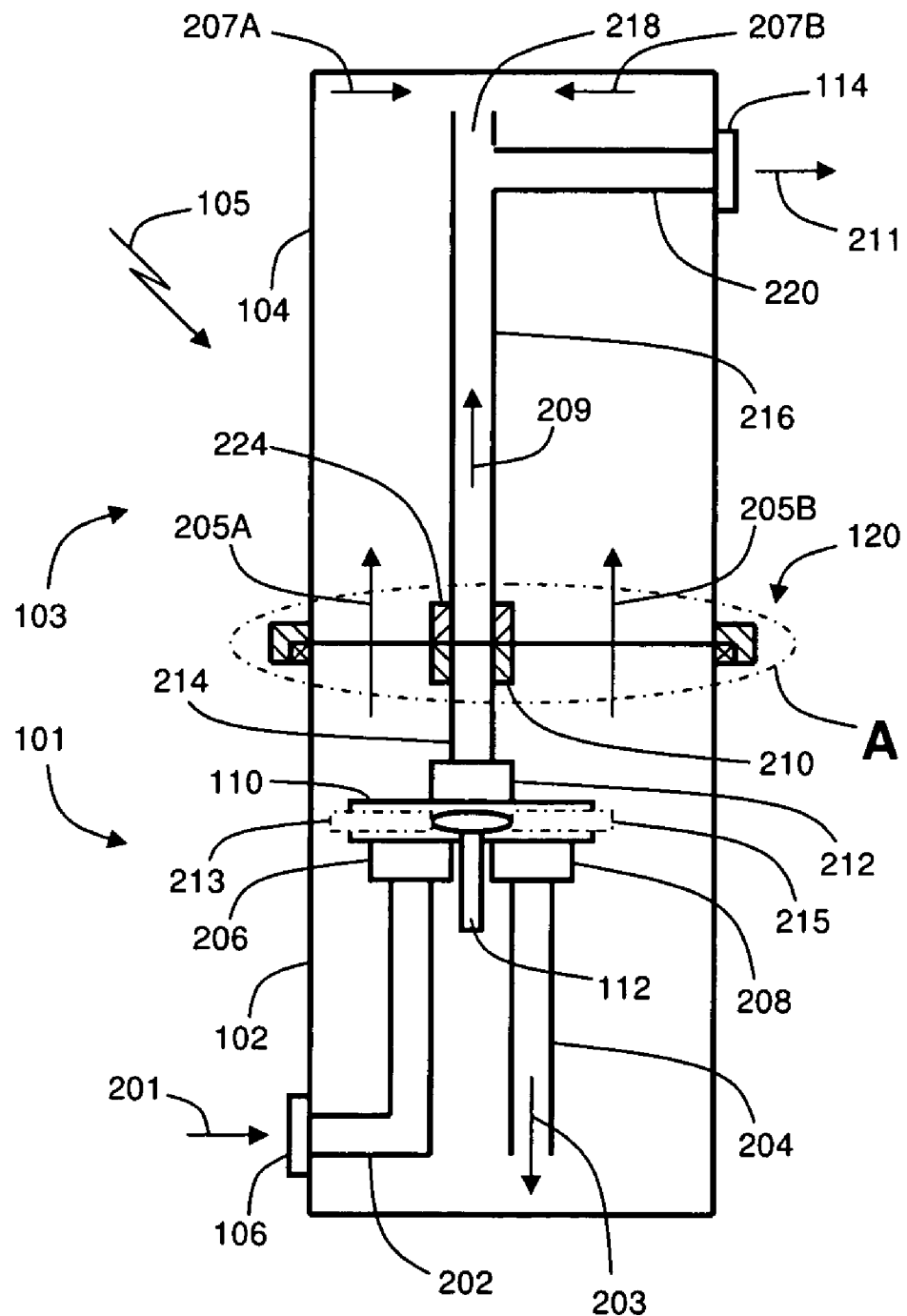
FIG. 2 is a schematic diagram illustrating a flow of water in the solar shower of FIG. 1.

FIG. 2 depicts a schematic diagram 200 illustrating a flow of water in the shower 100 of FIG. 1. Water is provided into the shower 100 via the intake port 106 of the reservoir 101, as shown with an arrow 201 (for example, using a garden hose).

Internal plumbing of the reservoir 101 comprises pipes 202, 204, and 214, a coupler 210, and the diverter valve 112 having an inlet 206 and outlets 208 and 212. The pipe 202 connects the intake port 106 to the inlet 206, the pipe 214 extends from the outlet 212 and is terminated with the coupler 210, and the pipe 204 extends from the outlet 208 and is fluidly connected to an interior of the reservoir 101. For example, an end of the pipe 204 may be open into the reservoir 101, as shown with an arrow 203.

Correspondingly, internal plumbing of the reservoir 103 comprises pipes 216 and 220 and a coupler 224. The coupler 224 terminates the pipe 216 and forms a water-conducting slip (i.e., movable) joint 310 (shown in FIG. 3 below) with the coupler 210. The pipe 216 is fluidly connected to an interior of the reservoir 103 and to the pipe 220, which connects the pipe 216 to the outlet port 114. In the depicted embodiment, an end 218 of the pipe 216 is open into the reservoir 103, and the pipes 216, 220 form a tee. Illustratively, in this embodiment, the pipes 216, 220 are branches of the same structure.

Generally, the pipes 202, 204, 214, 216, and 220 and the couplers 210, 224 may be fabricated from polymers, plastics, composites, metals, alloys, or a combination thereof. In one exemplary embodiment, these components of the shower 100 are fabricated from PVC or PE using injection-molding technique.

In one extreme position of the handle 112 of the diverter valve 110 (illustratively, in a position 213 (shown in phantom)), water coming from the intake port 106 flows through the pipe 202, inlet 206 and outlet 208 of the diverter valve 112, and pipe 204 into the reservoir 101, as shown with the arrow 203. After filling the reservoir 101, water flows into and fills the reservoir 103 (shown with arrows 205A-B) and enters the pipe 216 via the open end 218 thereof (shown with arrows 207A-B). Then, through the pipe 220 and outlet port 114, water flows into the shower head 116 (shown with an arrow 211). In operation, water in the reservoirs 101 and 103 is heated by the solar radiation 105, and in this position of the handle 112, water flowing from the shower head 116 has a high temperature T1.

In another extreme position of the handle 112 (illustratively, in a position 215 (shown in phantom)), water coming from the intake port 106 flows through the pipe 202, inlet 206 and outlet 212 of the diverter valve 110 into the pipes 214 and 216 (shown with an arrow 209). Thereafter, through the pipe 220, water flows into the shower head 116 (shown with the arrow 211). In operation in this configuration, water flowing to, into and then from shower head 116 has a low temperature T2 (approximately, the same temperature as water coming from the intake port 106)

In a preferred embodiment, when the reservoirs 101, 103 are at least partially empty, water fills the reservoirs prior to flowing into the shower head 116. When the handle 112 is in position 213, water enters reservoir 101 and then fills reservoir 103 before flowing into pipe 216 (and then to the shower head 116). With the handle 112 in position 215, water coming from the intake port 106 flows through the pipe 202, inlet 206 and outlet 212 of the diverter valve 110 into the pipes 214 and 216 (shown with an arrow 209). Thereafter, through the pipe 220, water flows into the shower head 116 (shown with the arrow 211). However, until reservoirs 101 and 103 are filled, water will also continue to flow up pipe 209 and out opening 218 until the reservoirs are full. In this position of the handle 112, water flowing from the shower head 116 has a low temperature T2 (again, approximately, the same temperature as water coming from the intake port 106).

In operation, by selecting an intermediate position of the handle 112, temperature of water sprayed by the shower head 116 may be regulated in a range from T2 ("cold") to T1 ("hot").

Figure 3:
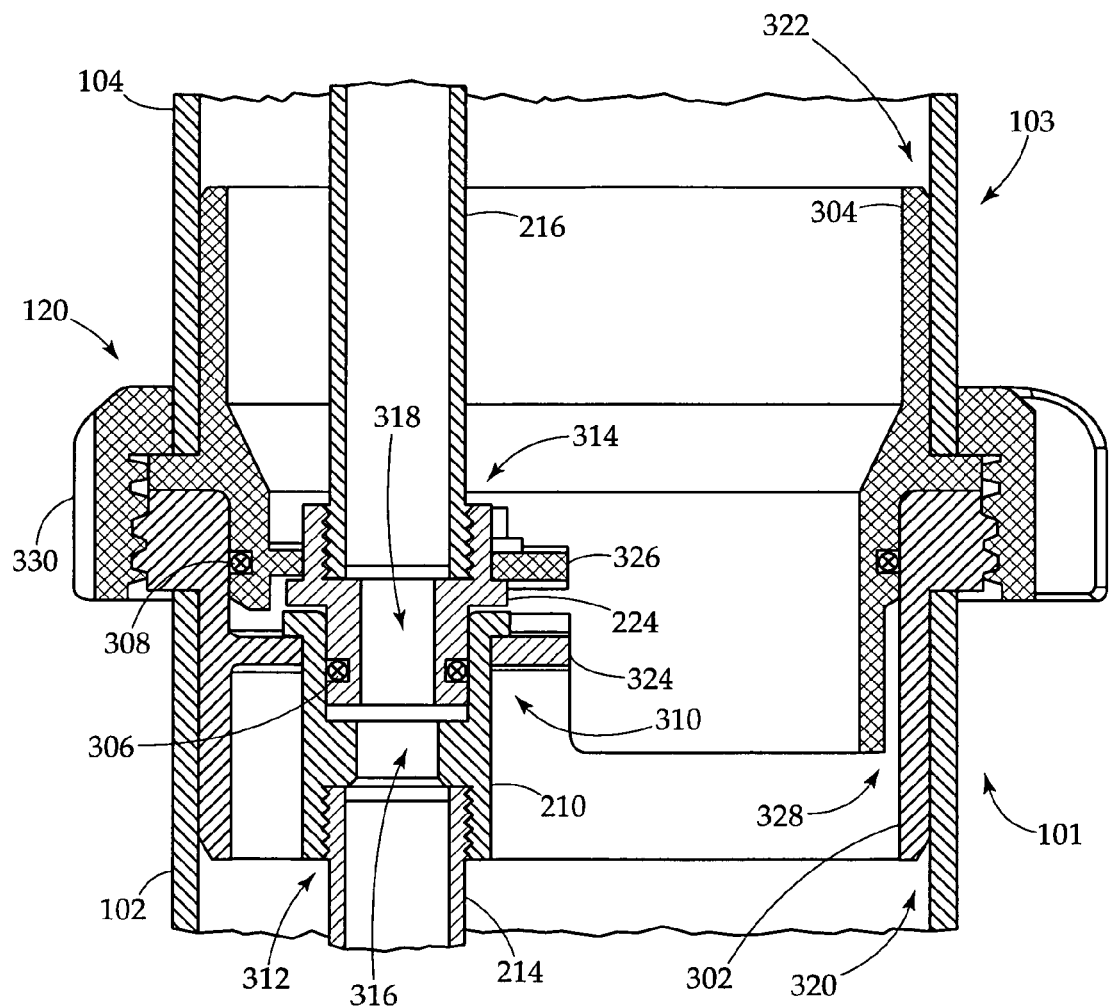
FIG. 3 is a schematic drawing illustrating a connection between reservoirs of the solar shower of FIG. 1.

FIG. 3 is a schematic drawing illustrating a connection between reservoirs 101 and 103 of the shower 100 of FIG. 1. Specifically, FIG. 3 shows an exploded view of a portion A in FIG. 2 in an assembled state of the shower 100 (i.e., when the reservoirs 101 and 103 are attached to one another).

In the depicted embodiment, the reservoir 101 comprises an insert 302 and the reservoir 103 comprises an insert 304. The inserts 302, 304 form fixed water-tight joints 320 and 322 with the enclosures 102 and 104, respectively (adhesive joints 320, 322 are shown) and, together, form a slip joint 328. In the slip joint 328, a path between adjacent surfaces of the inserts 302 and 304 is water-sealed using an o-ring 308 (illustratively, the o-ring 308 is disposed in the insert 304).

The insert 302 includes a guide 324 defining an end position of the coupler 210 and a threaded outer flange 340 for engaging a lock ring 330, and the insert 304 includes a guide 326 defining an end position of the coupler 224. In operation, the guides 324 and 326 provide matching of the end positions of the couplers 210, 224.

The pipes 214 and 216 form fixed water-tight joints 312 and 314 with the couplers 210 and 224, respectively (for example, threaded (as shown) or, alternatively, adhesive joints 312, 314). The couplers 210 and 224 have coinciding through holes 316 and 318, respectively, and, together, form a water-conducting slip joint 310. The slip joint 310 may include an o-ring that water-seals a path between adjacent surfaces of the couplers 210, 224 (o-ring 306 disposed in the coupler 224 is shown).

To attach the reservoir 101 to the reservoir 103, the couplers 210 and 224 are advanced towards one another to form the slip joint 310, and then a lock ring 330 is engaged into a thread formed on an outer flange 340 of the insert 302 and is tightened thereto. Correspondingly, to detach the reservoirs 101 and 103, the lock ring 330 is disengaged from the outer flange 340 of the insert 302 and the enclosures 102 and 104 are pulled apart, thereby separating the couplers 210, 224.

Figure 4A:
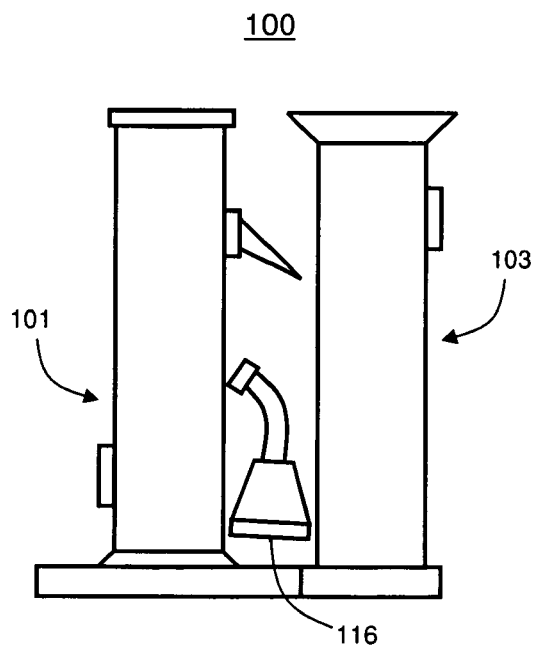
FIGS. 4A-4B are schematic drawings depicting the solar shower of FIG. 1 prepared for storage and/or transportation.
Figure 4B:
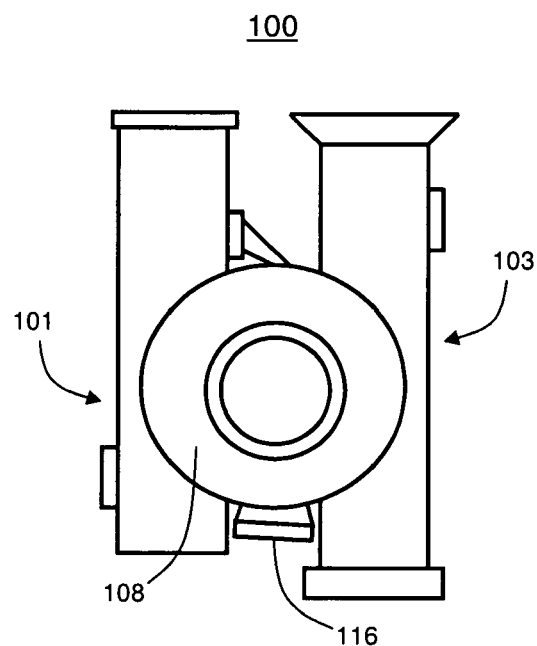

FIGS. 4A-4B are schematic drawings depicting the shower 100 of FIG. 1 prepared for storage and/or transportation. In one embodiment (FIG. 4A), the reservoirs 101 and 103 are detached from one another as discussed above in reference to FIG. 3, and the shower head 116 is separated from the reservoir 103. In an alternate embodiment (FIG. 4B), additionally, the base 108 is separated from the reservoir 101.

Although the invention herein has been described with reference to particular illustrative embodiments thereof, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A solar shower, comprising:
   a first water reservoir having a first port for coupling to a water source, and a diverter valve for regulating temperature of water flowing into a shower head; and
   a second water reservoir having a second port for coupling to the shower head, said second reservoir detachably connected to the first reservoir;
   wherein the first water reservoir comprises:
      a first enclosure;
      the diverter valve having a first inlet, a first outlet, and a second outlet;
      a first pipe having a first end connected to first inlet and a second end connected to the first port;
      a second pipe having a third end connected to the first outlet and a fourth end fluidly connected to an interior of the first enclosure;
      a third pipe having a fifth end connected to the second outlet and a sixth end connected to a first coupler having a first through hole; and
      a first insert defining an end position of the first coupler.

2. The solar shower of claim 1, wherein:
   the third pipe forms a first fixed water-tight joint with the first coupler; and
   the first insert forms a third fixed water-tight joint with the first enclosure.

3. The solar shower of claim 2, wherein at least one of the first or third fixed water-tight joints is a threaded joint or an adhesive joint.

4. The solar shower of claim 1, wherein the second water reservoir comprises:
   a second enclosure;
   a fourth pipe having (i) a seventh end fluidly connected to an interior of the second enclosure and to the second port and (ii) an eighth end connected to a second coupler forming a first slip joint with the first coupler, said second coupler having a second through hole at least partially coinciding with the first through hole; and a second insert defining an end position of the second coupler, said second insert forming a second slip joint with the first insert.

5. The solar shower of claim 4, wherein the first slip joint is a substantially water-tight slip joint.

6. The solar shower of claim 4, wherein:
the fourth pipe forms a second fixed water-tight joint with the second coupler; and
the second insert forms a fourth fixed water-tight joint with the second enclosure.

7. The solar shower of claim 6, wherein at least one of the second or fourth fixed water-tight joints is a threaded joint or an adhesive joint.

8. The solar shower of claim 4, wherein at least one of the first and second couplers comprises an o-ring disposed in a path between adjacent surfaces of said couplers.

9. The solar shower of claim 4, wherein at least one of the first and second inserts comprises an o-ring disposed in a path between adjacent surfaces of said inserts.

10. The solar shower of claim 4, wherein at least one of (i) the first enclosure and second enclosure, (ii) the first through fourth pipes, and (iii) the first and second couplers is fabricated from a polymer, a plastic, a composite, a metal, an alloy, or a combination thereof.

11. The solar shower of claim 4, wherein at least one of (i) the first enclosure and second enclosure, (ii) the first through fourth pipes, and (iii) the first and second couplers is fabricated from PVC (polyvinyl chloride) or PE (polyethylene).

12. A solar shower, comprising:
a first water reservoir having a first port for coupling to a water source, and a diverter valve for regulating temperature of water flowing into a shower head; and
a second water reservoir having a second port for coupling to the shower head, said second reservoir detachably connected to the first reservoir;
wherein the second water reservoir is detachably connected to the first water reservoir using a threaded joint having a lock ring, a clamp, or a flange.

* * * * *